US012071327B2

(12) United States Patent
Zhao et al.

(10) Patent No.: US 12,071,327 B2
(45) Date of Patent: Aug. 27, 2024

(54) LOAD BEARING MEMBER INCLUDING LATERAL LAYER

(71) Applicant: OTIS ELEVATOR COMPANY, Farmington, CT (US)

(72) Inventors: Wenping Zhao, Glastonbury, CT (US); Daniel A. Mosher, Glastonbury, CT (US); John P. Wesson, West Hartford, CT (US); Paul Papas, West Hartford, CT (US); Gopal R. Krishnan, Wethersfield, CT (US); Brad Guilani, Woodstock Valley, CT (US); Richard N. Fargo, Plainville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/819,995

(22) Filed: Aug. 16, 2022

(65) Prior Publication Data

US 2022/0388811 A1 Dec. 8, 2022

Related U.S. Application Data

(62) Division of application No. 16/085,700, filed as application No. PCT/US2017/021532 on Mar. 9, 2017, now Pat. No. 11,447,368.

(Continued)

(51) Int. Cl.
*B66B 7/06* (2006.01)
*D07B 1/22* (2006.01)

(52) U.S. Cl.
CPC ................ *B66B 7/062* (2013.01); *D07B 1/22* (2013.01); *D07B 2501/2007* (2013.01)

(58) Field of Classification Search
CPC .... B66B 7/062; D07B 2501/2007; D07B 1/22
See application file for complete search history.

(56) References Cited

U.S. PATENT DOCUMENTS 3,297,513 A * 1/1967 Peter ...................... B65G 15/34 428/111
3,787,930 A 1/1974 Allen (Continued)

FOREIGN PATENT DOCUMENTS

CN 101663222 A 3/2010
CN 104649097 A * 5/2015

(Continued)

OTHER PUBLICATIONS

Chinese Office Action Issued In CN Application No. 201780020644.9, Mail Date Jul. 3, 2019, 8 Pages.

(Continued)

*Primary Examiner* — Michael R Mansen
*Assistant Examiner* — Michelle M Mudwilder
(74) *Attorney, Agent, or Firm* — CANTOR COLBURN LLP

(57) ABSTRACT

A load bearing member for a lifting and/or hoisting system includes a plurality of tension members arranged along a width of the load bearing member. Each tension member includes a plurality of load carrying fibers arranged to extend in a direction parallel to a length of the load bearing member and a matrix material in which the plurality of load carrying fibers are arranged. The load bearing member further includes a lateral layer and a jacket material at least partially encapsulating the plurality of tension members.

4 Claims, 5 Drawing Sheets

Related U.S. Application Data

(60) Provisional application No. 62/308,452, filed on Mar. 15, 2016.

(56) References Cited

U.S. PATENT DOCUMENTS

| | | | | |
|---|---|---|---|---|
| 5,584,897 | A | 12/1996 | Christlanson et al. | |
| 5,881,843 | A * | 3/1999 | O'Donnell | D07B 1/025 187/254 |
| 6,983,826 | B2 * | 1/2006 | Wake | B66B 11/043 187/250 |
| 7,661,514 | B2 | 2/2010 | Ach | |
| 8,479,888 | B2 | 7/2013 | Göser | |
| 8,568,260 | B2 | 10/2013 | Baldovino et al. | |
| 8,673,433 | B2 | 3/2014 | Reif et al. | |
| 8,789,658 | B2 | 7/2014 | Göser | |
| 9,050,768 | B2 | 6/2015 | Urbani et al. | |
| 9,115,466 | B2 * | 8/2015 | Wesson | D03D 15/56 |
| 9,341,232 | B2 | 5/2016 | Wu et al. | |
| 10,710,842 | B2 | 7/2020 | Zhao et al. | |
| 2006/0287148 | A1 | 12/2006 | Wood et al. | |
| 2007/0093334 | A1 | 4/2007 | Ach | |
| 2008/0078657 | A1 | 4/2008 | Hawkins et al. | |
| 2008/0087500 | A1 | 4/2008 | Ach et al. | |
| 2008/0164127 | A1 | 7/2008 | Hawkins | |
| 2010/0133046 | A1 | 6/2010 | Allwardt et al. | |
| 2010/0140022 | A1 | 6/2010 | Ach | |
| 2011/0088981 | A1 | 4/2011 | Urbani et al. | |
| 2012/0211310 | A1 | 8/2012 | Peric et al. | |
| 2014/0291076 | A1 | 10/2014 | Guilani et al. | |
| 2014/0305744 | A1 * | 10/2014 | Kere | B66B 7/1238 187/254 |
| 2014/0305745 | A1 | 10/2014 | Alasentie et al. | |
| 2014/0318902 | A1 | 10/2014 | Pelto-Huikko et al. | |
| 2015/0101888 | A1 | 4/2015 | Pelto-Huikko | |
| 2015/0191330 | A1 * | 7/2015 | Zhao | D03D 1/0094 428/68 |
| 2016/0060077 | A1 * | 3/2016 | Haapaniemi | B66B 9/00 187/255 |
| 2017/0057787 | A1 | 3/2017 | Zhao et al. | |
| 2017/0057788 | A1 * | 3/2017 | Helenius | B66B 7/062 |
| 2019/0071281 | A1 | 3/2019 | Zhao et al. | |

FOREIGN PATENT DOCUMENTS

| | | | | |
|---|---|---|---|---|
| DE | 3813338 | A1 | 11/1989 | |
| DE | 102010042357 | A1 * | 4/2012 | B29C 47/0021 |
| EP | 1561719 | A1 | 8/2005 | |
| EP | 1975111 | A1 | 10/2008 | |
| EP | 2567924 | A1 | 3/2013 | |
| EP | 2913288 | A1 | 9/2015 | |
| JP | 2009274797 | A | 11/2009 | |
| JP | 5169465 | B2 | 3/2013 | |
| KR | 20100102169 | A * | 9/2010 | B29C 47/0021 |
| WO | 0037738 | | 6/2000 | |
| WO | 2006042427 | A1 | 4/2006 | |
| WO | 2008110241 | A2 | 9/2008 | |
| WO | 2009090299 | A1 | 7/2009 | |
| WO | 2010072690 | A1 | 7/2010 | |
| WO | 2015134025 | A1 | 9/2015 | |
| WO | 2015152899 | A1 | 10/2015 | |

OTHER PUBLICATIONS

International Search Report for International Application No. PCT/US2017/021532; International Filing Date Mar. 9, 2017; Date of Mailing May 23, 2017; 7 Pages.

International Preliminary Report on Patentability for Application No. PCT/US2017/021532, Mailed Sep. 27, 2018.

Office Action for Korean Application No. 10-2018-7029326 Issued Aug. 18, 2021 Received Oct. 5, 2021.

Office Action for Korean Application No. 10-2018-7029326 Issued Mar. 14, 2022, Received Apr. 8, 2022.

Office Action for Japanese Application No. 2018-548779 Issued Jan. 5, 2021, Received Feb. 2, 2021.

Office Action for Japanese Application No. 2018-548779 Issued Nov. 24, 2021, Received Dec. 20, 2021.

Office Action for Japanese Application No. 2018-548779 Issued May 17, 2022.

Office Action for Chinese Application No. 201780020644.9 Issued Mar. 25, 2020.

Office Action for Chinese Application No. 201780020644.9 Issued Sep. 14, 2020, Received Oct. 26, 2020.

Office Action for Chinese Application No. 201780020644.9 Issued Jun. 29, 2022.

Office Action for Australian Application No. 2017233850 Issued Nov. 22, 2021.

Written Opinion for International Application No. PCT/US2017/021532; International Filing Date Mar. 9, 2017; Date of Mailing May 23, 2017; 7 Pages.

* cited by examiner

LOAD BEARING MEMBER INCLUDING LATERAL LAYER

CROSS REFERENCE TO RELATED APPLICATIONS

This application is a divisional of U.S. application Ser. No. 16/085,700, filed Sep. 17, 2018, which is a National Stage application of International Patent Application No. PCT/US2017/021532, filed Mar. 9, 2017, which claims the benefit of U.S. Provisional Application No. 62/308,452, filed Mar. 15, 2016, both of which are incorporated by reference in their entirety herein.

BACKGROUND

Embodiments disclosed herein relate to elevator systems, and more particularly, to a load bearing member configured for use in an elevator system.

Elevator systems are useful for carrying passengers, cargo, or both, between various levels in a building. Some elevators are traction based and utilize load bearing members such as ropes or belts for supporting the elevator car and achieving the desired movement and positioning of the elevator car.

Where ropes are used as load bearing members, each individual rope is not only a traction device for transmitting the pulling forces but also participates directly in the transmission of the traction forces. Where belts are used as a load bearing member, a plurality of tension elements are embedded in a elastomer belt body. The tension elements are exclusively responsible for transmitting the pulling forces, while the elastomer material transmits the traction forces. Due to their light weight and high strength, tension members formed from unidirectional fibers arranged in a rigid matrix composite provide significant benefits when used in elevator systems, particularly high rise systems.

The fibers are impregnated with thermosetting resins and then cured to form rigid composites that are surrounded with the elastomer to provide traction for the belt. Although a belt with continuous carbon fiber and thermoset resin matrix will provide improved strength to weight advantages compared to a steel cord belt, significant performance challenges exist. For example, the strength across the belt in a lateral direction, although not as demanding as along a belt length, is generally relatively low as it relies only on the thermoset resin matrix and the elastomer material. Further, other challenges remain in composite to jacket adhesion and fire resistance of composite belts.

BRIEF SUMMARY

In one embodiment, a load bearing member for a lifting and/or hoisting system includes a plurality of tension members arranged along a width of the load bearing member. Each tension member includes a plurality of load carrying fibers arranged to extend in a direction parallel to a length of the load bearing member and a matrix material in which the plurality of load carrying fibers are arranged. The load bearing member further includes a lateral layer and a jacket material at least partially encapsulating the plurality of tension members.

Additionally or alternatively, in this or other embodiments the lateral layer is a monolithic lateral layer.

Additionally or alternatively, in this or other embodiments the lateral layer includes a plurality of fibers with a distribution of fiber orientations, including fibers extending in directions non-parallel to the length of the load bearing member.

Additionally or alternatively, in this or other embodiments the plurality of fibers include one or more of carbon, glass, aramid, nylon, polyester, metallic or polymer fibers.

Additionally or alternatively, in this or other embodiments the lateral layer is located at a first side of the plurality of tension members and/or at a second side of the plurality of tension members, opposite the first side.

Additionally or alternatively, in this or other embodiments the lateral layer extends between two or more tension members of the plurality of tension members.

Additionally or alternatively, in this or other embodiments the lateral layer is wrapped around one or more tension members of the plurality of tension members.

Additionally or alternatively, in this or other embodiments the lateral layer is positioned at a traction surface of the load bearing member.

Additionally or alternatively, in this or other embodiments the lateral layer includes features to improve one or more of adhesion of the jacket material to the plurality of tension members, fire resistance, traction performance or wear resistance.

Additionally or alternatively, in this or other embodiments the load bearing member is a belt for an elevator system.

In another embodiment, an elevator system includes a hoistway, a drive machine having a traction sheave coupled thereto, an elevator car movable within the hoistway, a counterweight movable within the hoistway and at least one load bearing member connecting the elevator car and the counterweight. The load bearing member is arranged in contact with the traction sheave such that operation of the drive machine moves the elevator car between a plurality of landings. The at least one load bearing member includes a plurality of tension members arranged along a width of the load bearing member. Each tension member includes a plurality of load carrying fibers arranged to extend in a direction parallel to a length of the load bearing member and a matrix material in which the plurality of load carrying fibers are arranged. The at least one load bearing member further includes a lateral layer and a jacket material at least partially encapsulating the plurality of tension members.

Additionally or alternatively, in this or other embodiments the lateral layer is positioned at a first side of the plurality of tension members and/or at a second side of the plurality of tension members, opposite the first side.

Additionally or alternatively, in this or other embodiments the lateral layer extends between two or more tension members of the plurality of tension members.

Additionally or alternatively, in this or other embodiments the lateral layer is wrapped around one or more tension members of the plurality of tension members.

Additionally or alternatively, in this or other embodiments the lateral layer is a monolithic lateral layer.

Additionally or alternatively, in this or other embodiments the lateral layer includes a plurality of fibers with a distribution of fiber orientations, including fibers extending in directions non-parallel to the length of the load bearing member.

Additionally or alternatively, in this or other embodiments the plurality of fibers include one or more of carbon, glass, aramid, nylon, polyester, metallic, or polymer fibers.

Additionally or alternatively, in this or other embodiments the lateral layer is located at a traction surface of the load bearing member.

Additionally or alternatively, in this or other embodiments the lateral layer includes features to improve one or more of adhesion of the jacket material to the plurality of tension members, fire resistance, traction performance or wear resistance.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains disclosed embodiments, together with advantages and features, by way of example with reference to the drawings.

DETAILED DESCRIPTION

Figure 1:
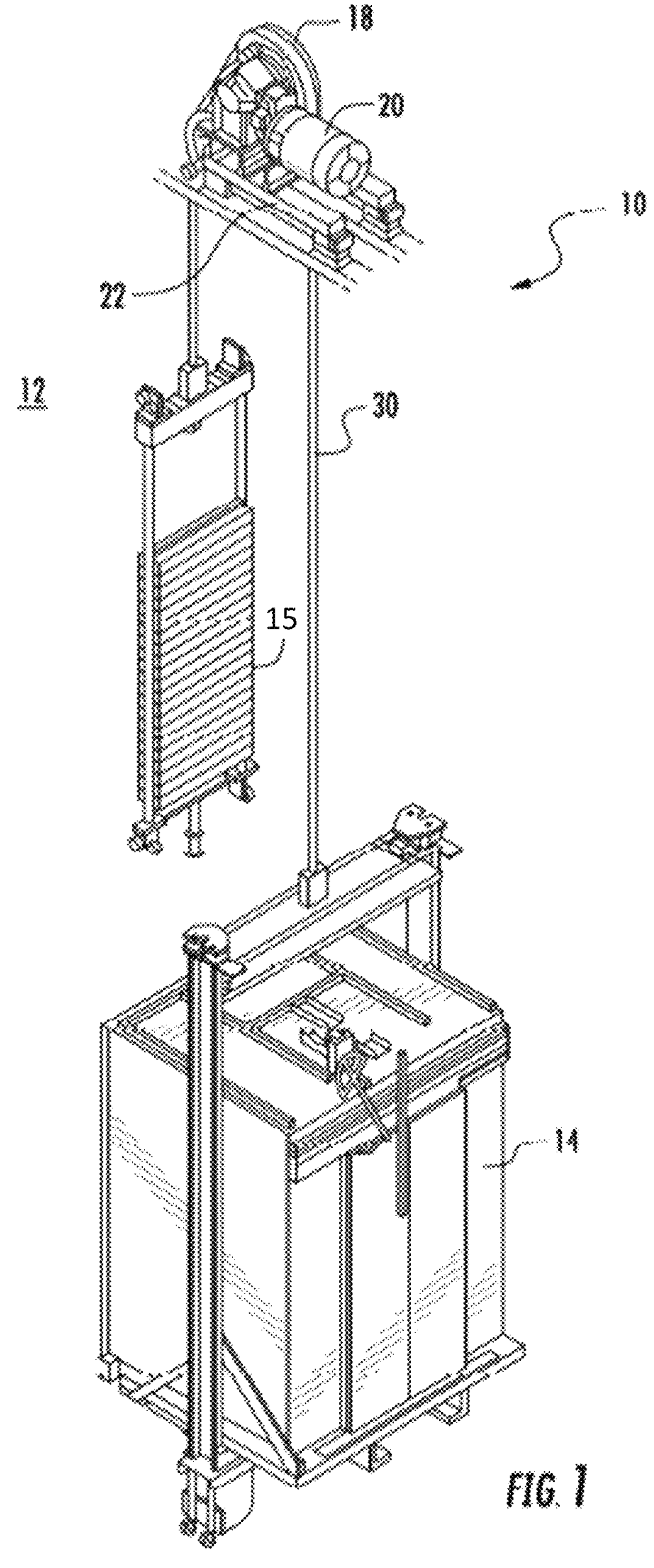
FIG. 1 is a perspective view of an example of a traction elevator system.

Referring now to FIG. 1, an exemplary embodiment of an elevator system 10 is illustrated. The elevator system 10 includes an elevator car 14 configured to move vertically upwardly and downwardly within a hoistway 12 along a plurality of car guide rails (not shown). Guide assemblies mounted to the top and bottom of the elevator car 14 are configured to engage the car guide rails to maintain proper alignment of the elevator car 14 as it moves within the hoistway 12.

The elevator system 10 also includes a counterweight 15 configured to move vertically upwardly and downwardly within the hoistway 12. The counterweight 15 moves in a direction generally opposite the movement of the elevator car 14 as is known in conventional elevator systems. Movement of the counterweight 15 is guided by counterweight guide rails (not shown) mounted within the hoistway 12. In the illustrated, non-limiting embodiment, at least one load bearing member 30, for example, a belt, coupled to both the elevator car 14 and the counterweight 15 cooperates with a traction sheave 18 mounted to a drive machine 20. To cooperate with the traction sheave 18, at least one load bearing member 30 bends in a first direction about the traction sheave 18.

The drive machine 20 of the elevator system 10 is positioned and supported at a mounting location atop a support member 22, such as a bedplate for example, in a portion of the hoistway 12 or a machine room. Although the elevator system 10 illustrated and described herein has a 1:1 roping configuration, elevator systems 10 having other roping configurations and hoistway layouts are within the scope of the present disclosure.

Figure 2:
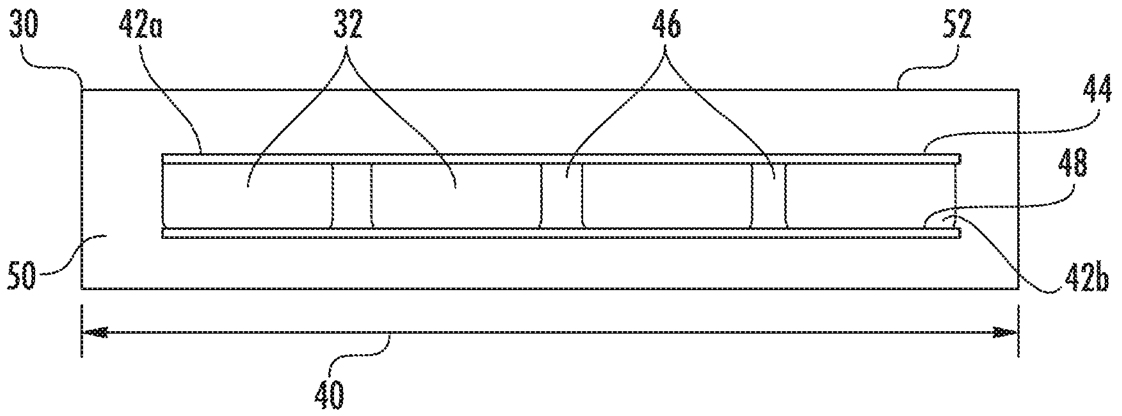
FIG. 2 is a cross-sectional view of an exemplary embodiment of a load bearing member for an elevator system having lateral layers.
Figure 3:
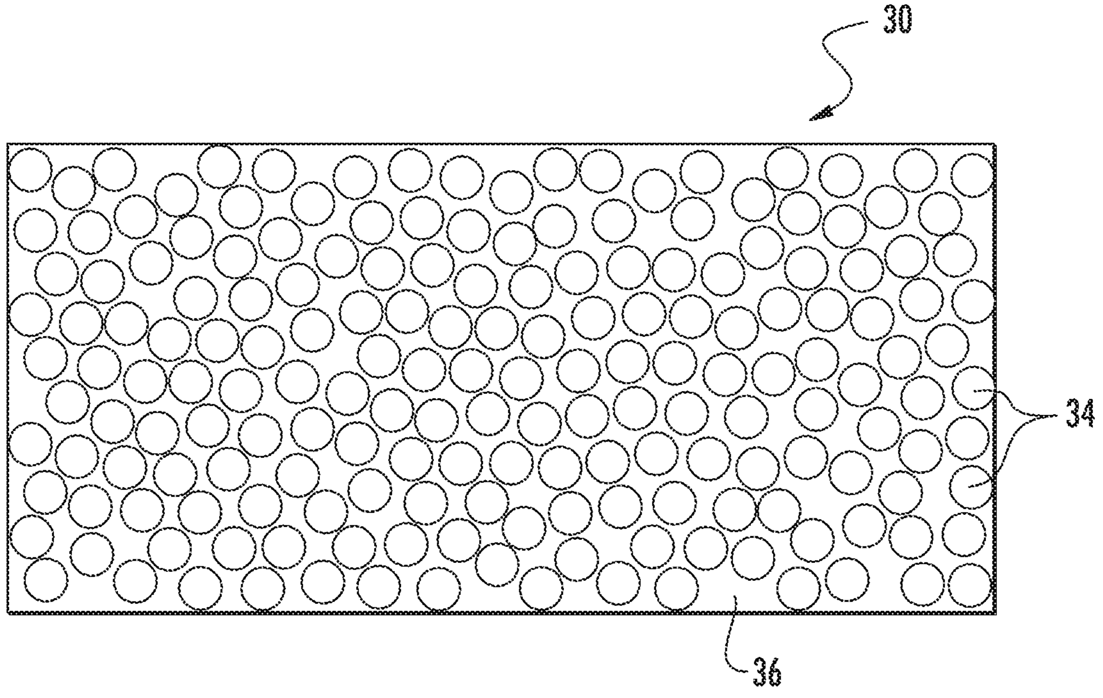
FIG. 3 is a cross-sectional view of an exemplary embodiment of a tension member.

Referring now to FIG. 2, a cross-sectional view of an exemplary load bearing member 30 is illustrated. While the load bearing member is described herein relative to an elevator system 10, it is to be appreciated that load bearing member 30 may be so utilized in other lifting and/or hoisting systems. The load bearing member 30 includes a plurality of tension members 32 each formed, as shown in FIG. 3, from a plurality of individual load carrying fibers 34 arranged unidirectionally, substantially in a direction parallel to a load bearing member 30 length, within a matrix material 36. As shown in the illustrated, non-limiting embodiment, the load carrying fibers 34 within the tension member 32 are randomly distributed throughout the matrix material 36, however, a density of the load carrying fibers 34 across the area of the tension member 32 remains nominally uniform. In other embodiments, however, the density of the fibers 34 may be non-uniform such that the tension member 32 may have other desired properties. The load carrying fiber 34 orientation and density are such that strength of the tension member 32 and the load carrying member 30 along the load bearing member length meets operational requirements.

Exemplary load bearing fibers 34 used to form a tension member 32 include, but are not limited to, carbon, glass, aramid, nylon, and polymer fibers, for example. Each of the fibers 34 within a single tension member 32 may be substantially identical or may vary. In addition, the matrix material 36 may be formed from any suitable material, such as polyurethane, vinylester, and epoxy for example. The materials of the fibers 34 and matrix material 36 are selected to achieve a desired stiffness and strength of the load bearing member 30.

Referring again to FIG. 2, the tension members 32 may be formed as thin layers, in some embodiments by a pultrusion process. In a standard pultrusion process, the fibers 34 are impregnated with the matrix material 36 and are pulled through a heated die and additional curing heaters where the matrix material 36 undergoes cross linking. A person having ordinary skill in the art will understand that controlled movement and support of the pulled fibers may be used to form a desired linear or curved profile of the untensioned load bearing member 30. In an exemplary embodiment, the tension members 32 each have a thickness of about 0.1 millimeters to about 4 millimeters.

The tension members 32 extend along the load bearing member 30 length, with tension members 32 arranged across a lateral width 40 of the load bearing member 30, and in some embodiments are spaced apart from one another as shown in FIG. 2. The tension members 32 are at least partially enclosed in a jacket material 50, to restrain movement of the tension members 32 in the load bearing member 30 and protect the tension members 32. In embodiments including the jacket material 50, the jacket material 50 defines a traction surface 52 configured to contact a corresponding surface of the traction sheave 18. Exemplary materials for the jacket material 50 include the elastomers of thermoplastic and thermosetting polyurethanes, polyamide, thermoplastic polyester elastomers, and rubber, for example. Other materials may be used to form the jacket material 50 if they are adequate to meet the required functions of the load bearing member 30. For example, a primary function of the jacket material 50 is to provide a sufficient coefficient of friction between the load bearing member 30 and the traction sheave 18 to produce a desired amount of traction therebetween. The jacket material 50 should also transmit the traction loads to the tension members 32. In addition, the jacket material 50 should be wear resistant and protect the tension members 32 from impact damage, exposure to environmental factors, such as chemicals, for example. One or more additive materials may be incorporated into the jacket material 50 to enhance performance such as traction and environmental resistance. For example, carbon black is very effective in improving UV-resistance of elastomers and carbodiamides are very effective in improving hydrolysis resistance of polyurethanes.

While in the embodiment shown there are four tension members 32 in the load bearing member 30, the number of tension members 32 is merely exemplary. In other embodiments, for example, one, two, three, five, six, seven, eight or more tension members 32 may be utilized. Further, while tension members 32 are shown as having substantially rectangular cross-sections, the depiction is merely one example. Tension members 32 having other cross-sectional shapes, such as circular, elliptical, square, oval or the like are contemplated within the scope of the present disclosure.

To improve lateral strength of the load bearing member 30 in a direction parallel to the lateral width 40, and in some embodiments to improve lateral strength of individual or groups of tension members 32, one or more lateral layers 42 are included in the load bearing member 30. The lateral layer 42 may be formed from, for example, a fibrous fabric material with at least some fibers oriented in a direction other than longitudinally along the load bearing member 30 length, such as nonparallel to the load bearing member 30 length. Further, fibers need not be uniform in their orientation. Some fibers may be oriented in a first direction, while other fibers may be oriented in a second direction different from the first direction. As one skilled in the art will readily appreciate, other embodiments may include fibers oriented in three or more directions, and may include a random distribution of fibers, with respect to fiber orientation. Fibers may be linear, curvilinear or may have other shape, such as a combination of linear and curvilinear shapes. The fabric may be, for example, woven, non-woven or stitched. In some embodiments, the fibers of the lateral layer 42 are oriented parallel to the lateral width 40 or diagonal to the lateral width 40. The lateral layer 42 may be a fabric material formed of metallic fibers, nonmetallic fibers or some combination thereof. In some embodiments, the fibers of the lateral layer 42 are formed from, for example, carbon, glass, aramid, nylon, polyester or metallic wires. The fibers of the lateral layer 42 and their orientation act to reinforce the load bearing member 30 in the lateral direction, parallel to the lateral width 40. The lateral layer 42 further may have an adhesion promotion feature to improve adhesion of the jacket material 50 with the tension members 32. The adhesion promotion feature may be an open weave or texture to receive the jacket material 50 or may be an additional adhesive material. In addition, the lateral layer 42 may have other advantageous properties, such as fire resistance and/or impact resistance. For superior fire resistance, materials such as glass fiber, a low combustible fabric such as Kevlar, or a metallic wire material may be utilized. Further, rather than a fabric, the lateral layer 42 may be a monolithic film or metallic layer, such as an aluminum foil, to provide lateral stiffness and/or fire resistance. The monolithic film may be a lateral layer 42 free of fibers, and may be a uniform layer or alternatively may be, for example, a discontinuous or perforated layer.

Figure 4:
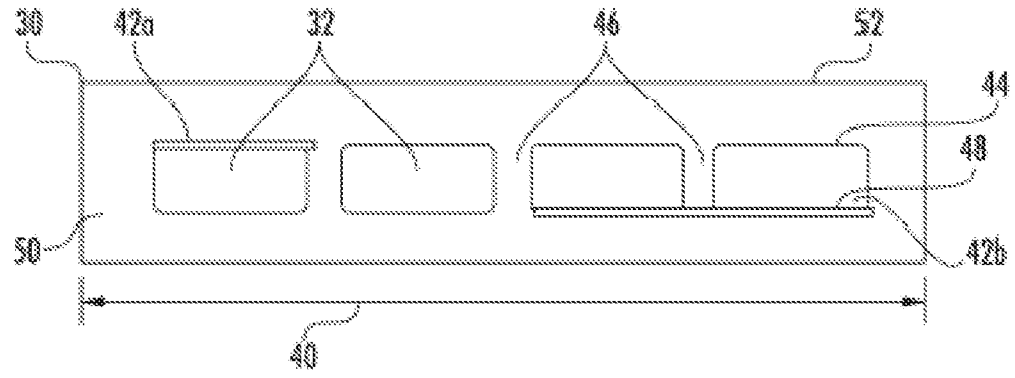
FIG. 4 is a cross-sectional view of yet another exemplary embodiment of a load bearing member for an elevator system having lateral layers

In the embodiment of FIG. 2, the load bearing member 30 includes two lateral layers 42. A first lateral layer 42*a* is located at a first side 44 of each tension member 32, spanning gaps 46 between adjacent tension members 32, and may be secured to each tension member 32 via the cure of the matrix material 36, or alternatively be an adhesive material. Similarly, a second lateral layer 42*b* is located at a second side 48, opposite the first side 44, or each tension member 32, also spanning gaps 46 between adjacent tension members 32, and secured to each tension member 32. In some embodiments, material filling gaps 46 is the same as jacket material 50, while in other embodiments material filling gaps 46 between the tension members 32 may be formed from a material different from jacket material 50. Breakage in the load bearing member 30 due to lateral stresses is mitigated by the lateral layer 42. In some embodiments, first lateral layer 42*a* and second lateral layer 42*b* are formed from the same material, while in other embodiments, the materials may be different depending on desired properties of the layers 42*a* and 42*b*. In some embodiments, the lateral layer 42 is flat, as is shown in FIG. 2, while in other embodiments the lateral layer 42 may have a selected degree of waviness to comply with lateral stiffness requirements. Further, while in the embodiment of FIG. 2, the lateral layers 42 extend across each of the tension members 32, in some embodiments such as shown in FIG. 4, the lateral layers 42 may extend across one or more, but not all of the tension members 32. Further, lateral layers 42 may all be disposed at, for example, first side 44 or second side 48, or the location of lateral layer 42 may vary.

Figure 5:
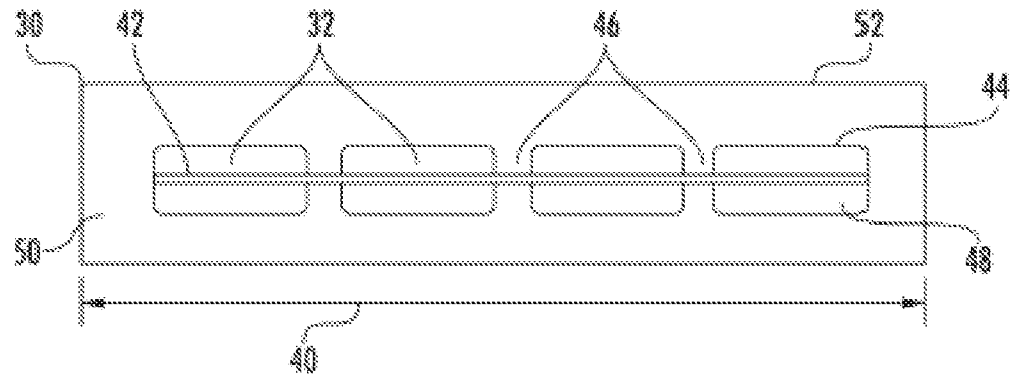
FIG. 5 is a cross-sectional view of another exemplary embodiment of a load bearing member for an elevator system having lateral layers.

While in the embodiment of FIG. 2, lateral layers 42*a* and 42*b* are located at first side 44 and second side 48, respectively, it is to be appreciated that such a location is merely exemplary, and that a lateral layer 42 may be located at any selected location of the load bearing member 30 to advantageously improve lateral strength of the load bearing member 30. For example, in the embodiment of FIG. 5, tension members 32 are arranged laterally across the load bearing member 30 and also arranged across a thickness of the load bearing member 30. In such embodiments. a lateral layer 42 may extend laterally across the load bearing member 30 spanning lateral gaps 46 between tension members 32, and is positioned between tension members 32, relative to a thickness of the load bearing member. While the embodiment of FIG. 5 shows one lateral layer 42 positioned between two tension members 32, it is to be appreciated that more than one lateral layer 42 may be utilized to form alternating layers of tension members 32 and lateral layers 42. Further, in some embodiments one or more lateral layers 42 may extend through each tension member 32, while additional lateral layers 42 may be positioned at, for example, first side 44 and/or second side 48 of the tension members 32. Further, in other embodiments, lateral layers 42 may extend through only selected tension members 32.

Figure 6:
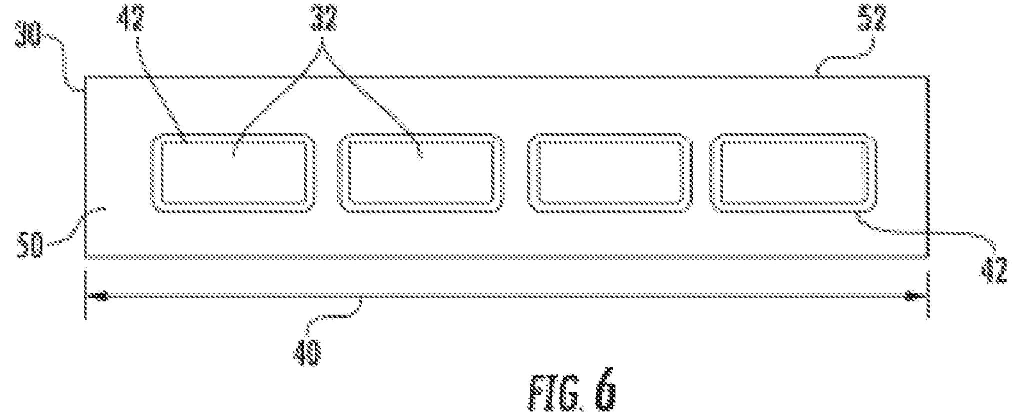
FIG. 6 is a cross-sectional view of an exemplary embodiment of a load bearing member for an elevator system having lateral layers wrapping individual tension members.

In another embodiment shown in FIG. 6, a lateral layer 42 is wrapped around a corresponding tension member 32, enveloping the tension member 32. In the embodiment of FIG. 6, each of the tension members 32 is wrapped by a corresponding lateral layer 42, but it is to be appreciated that in other embodiments, only selected tension members 32 are wrapped with a corresponding lateral layer 42. Embodiments such as those shown in FIG. 6, may further improve lateral strength of the individual tension members 32 via the lateral layer 42. Lateral strength of the tension member 32 is of particular importance under fatigue loading of the tension member 32.

Figure 7:
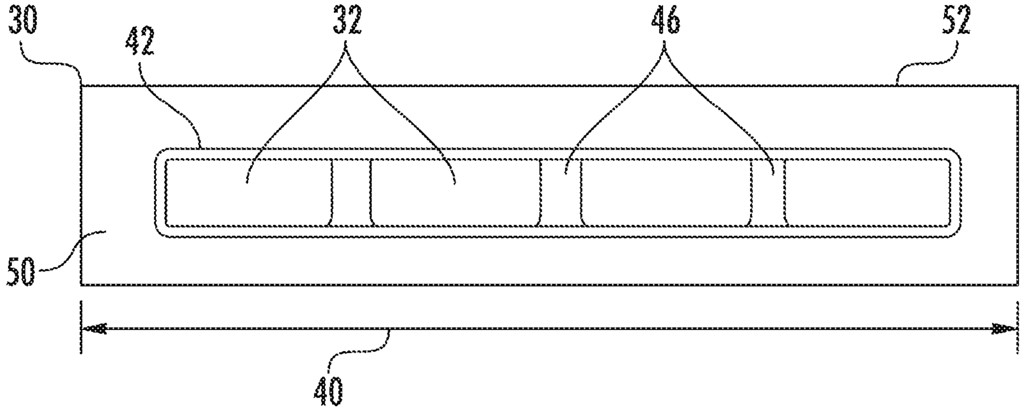
FIG. 7 is a cross-sectional view of an exemplary embodiment of a load bearing member for an elevator system having lateral layers wrapping groups of tension members.
Figure 8:
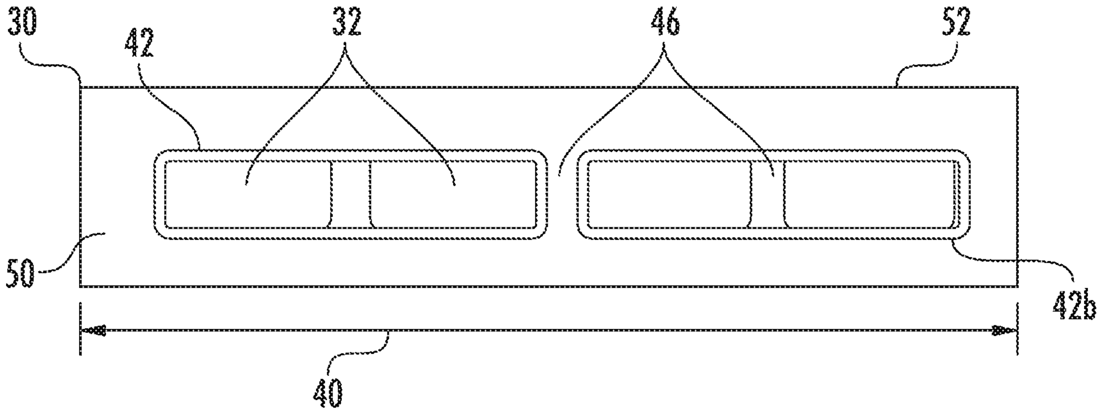
FIG. 8 is a cross-sectional view of another exemplary embodiment of a load bearing member for an elevator system having lateral layers wrapping groups of tension members.
Figure 9:
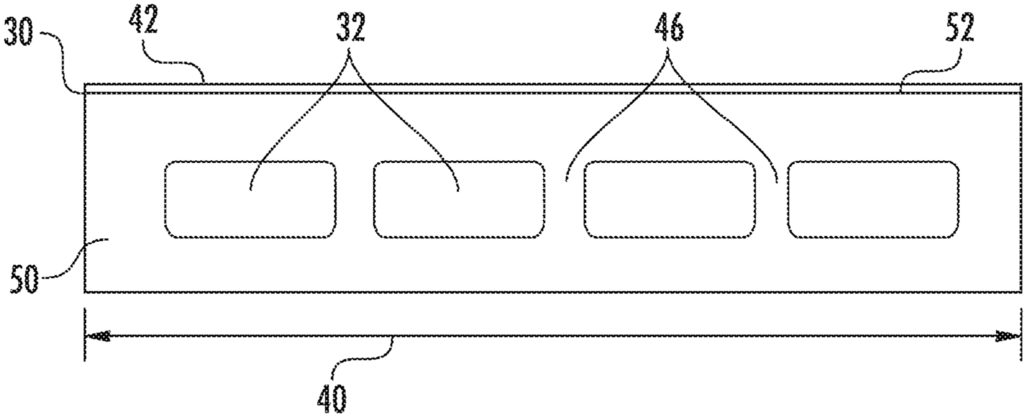
FIG. 9 is a cross-sectional view of an exemplary embodiment of a load bearing member for an elevator system having a lateral layer located at an external surface of the load bearing member.
Figure 10:
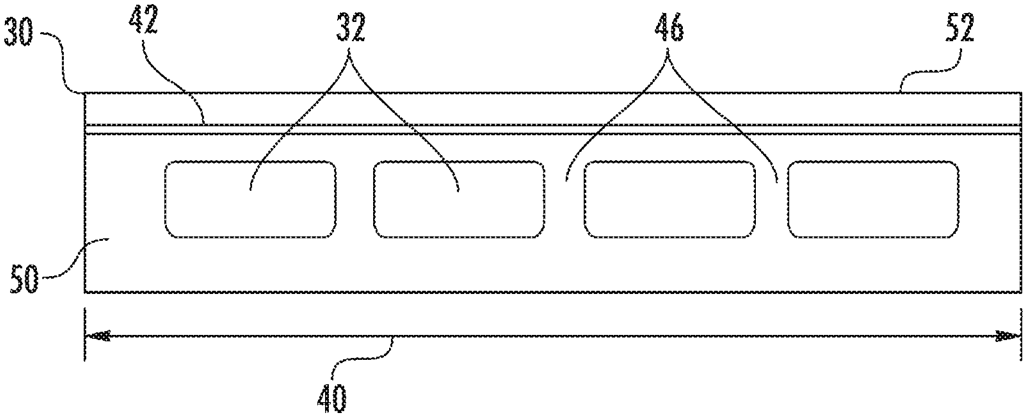
FIG. 10 illustrates an embodiment of a load bearing member having a lateral layer located internal to the load bearing member without contacting the tension members of the load bearing member.

Referring now to FIG. 7, in another embodiment a group of tension members 32 are enveloped by a lateral layer 42. In the embodiment of FIG. 7, the lateral layer 42 wraps the entirety of the tension members 32 of the load bearing member 30, but one skilled in the art will readily appreciate that a subset or subsets of the tension members 32 may be wrapped by lateral layers 42 as shown in FIG. 8. Further, in another embodiment, as shown in FIG. 9, the lateral layer 42 may be located at one or more of external surfaces of the load bearing member 30, such as the traction surface 52, interactive with traction sheave 18. In the embodiment of FIG. 9, the lateral layer 42 may include features that improve traction and/or improve wear resistance of the traction surface 52, compared to a load bearing member 30 without the lateral layer 42. In yet another embodiment, shown in FIG. 10, the lateral layer 42 is enveloped by the jacket material 50 such that the lateral layer 42 is not located at any of the external surfaces of the load bearing member 30 and further does not contact the tension members 32.

The disclosed load bearing member with lateral layer provides a number of benefits including lateral strength enhancement to prevent unidirectional breakage and therefore minimize load bearing member failure. Additional benefits include improvements to load bearing member flexibility, fire resistance, impact resistance and improved adhesion between the tension members and jacket material.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A load bearing member for a lifting and/or hoisting system comprising:

a plurality of tension members arranged along a width of the load bearing member, each tension member including:

a plurality of load carrying fibers arranged to extend in a direction parallel to a length of the load bearing member; and a matrix material in which the plurality of load carrying fibers are arranged;

a lateral layer; and a jacket material at least partially encapsulating the plurality of tension members;

wherein the plurality of tension members are arranged into two or more tension member groups, each tension member group including at least two tension members of the plurality of tension members;

wherein the lateral layer is two or more lateral layers, a first lateral layer of the two or more lateral layers wrapped around a first tension member group of the two or more tension member groups, and a second lateral layer of the two or more lateral layers is wrapped around a second tension member group of the two or more tension member groups;

wherein the at least two tension members of the first tension member group are spaced apart laterally across the width of the load bearing member;

wherein the first lateral layer is absent from the lateral space between the at least two tension members of the first tension member group; and wherein the load bearing member is configured as a belt having a substantially rectangular cross-sectional shape;

wherein a lateral space defined between the first tension member group and the second tension member group is filled with a material different than the jacket material and a material different than the tension member material.

2. The load bearing member of claim 1, wherein each tension member of the plurality of tension members has a rectangular cross-sectional shape.

3. The load bearing member of claim 1, wherein the lateral space defined between the first tension member group and the second tension member group is filled with only a material different than the jacket material.

4. An elevator system, comprising:

a hoistway;

a drive machine having a traction sheave coupled thereto;

an elevator car movable within the hoistway;

a counterweight movable within the hoistway;

at least one load bearing member connecting the elevator car and the counterweight, the load bearing member being arranged in contact with the traction sheave such that operation of the drive machine moves the elevator car between a plurality of landings, the at least one load bearing member including:

a plurality of tension members arranged along a width of the load bearing member, each tension member including:

a plurality of load carrying fibers arranged to extend in a direction parallel to a length of the load bearing member; and a matrix material in which the plurality of load carrying fibers are arranged;

a lateral layer; and a jacket material at least partially encapsulating the plurality of tension members;

wherein the plurality of tension members are arranged into two or more tension member groups, each tension member group including at least two tension members of the plurality of tension members;

wherein the lateral layer is two or more lateral layers, a first lateral layer of the two or more lateral layers wrapped around a first tension member group of the two or more tension member groups, and a second lateral layer of the two or more lateral layers is wrapped around a second tension member group of the two or more tension member groups;

wherein the at least two tension members of the first tension member group are spaced apart laterally across the width of the load bearing member;

wherein the first lateral layer is absent from the lateral space between the at least two tension members of the first tension member group; and wherein the load bearing member is configured as a belt having a substantially rectangular cross-sectional shape;

wherein a lateral space defined between the first tension member group and the second tension member group is filled with a material different than the jacket material and a material different than the tension member material.

* * * * *